US007118792B2

(12) United States Patent
Hewitt et al.

(10) Patent No.: US 7,118,792 B2

(45) Date of Patent: *Oct. 10, 2006

(54) FILMS, PACKAGING AND METHODS FOR MAKING THEM

(75) Inventors: Jonathan Hewitt, Wigton (GB); Peter Mills, Wigton (GB)

(73) Assignee: Innovia Films Limited, Cumbria (GB)

(*) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 126 days.

(21) Appl. No.: 10/250,919

(22) PCT Filed: Jan. 7, 2002

(86) PCT No.: PCT/EP02/00075

§ 371 (c)(1),
(2), (4) Date: Oct. 8, 2003

(87) PCT Pub. No.: WO02/053473

PCT Pub. Date: Jul. 11, 2002

(65) Prior Publication Data

US 2004/0048081 A1 Mar. 11, 2004

(30) Foreign Application Priority Data

Jan. 8, 2001 (GB) ................................ 0100352.4

(51) Int. Cl.
*B32B 3/06* (2006.01)

(52) U.S. Cl. .................................... 428/100; 229/87.05

(58) Field of Classification Search .................. 428/43; 53/412, 416; 426/187, 122; 432/8; 219/384, 219/388; 156/499; 522/2

See application file for complete search history.

(56) References Cited

U.S. PATENT DOCUMENTS

| | | | | |
|---|---|---|---|---|
| 3,873,735 | A * | 3/1975 | Chalin et al. | 426/87 |
| 4,670,352 | A * | 6/1987 | Kurz | 428/571 |
| 4,834,245 | A * | 5/1989 | Ohga et al. | 383/201 |
| 5,556,674 | A * | 9/1996 | Meilhon | 428/34.9 |
| 5,630,308 | A * | 5/1997 | Guckenberger | 53/412 |

FOREIGN PATENT DOCUMENTS

| | | | |
|---|---|---|---|
| EP | 0 515 825 | | 12/2002 |
| WO | 98 14317 | | 4/1998 |
| WO | WO 01/96194 | * | 6/2000 |
| WO | 01 96194 | | 12/2001 |
| WO | WO 01/96194 | * | 12/2001 |

* cited by examiner

*Primary Examiner*—Colleen P. Cooke
*Assistant Examiner*—Paul Wartalowicz
(74) *Attorney, Agent, or Firm*—Wenderoth, Lind & Ponack, L.L.P.

(57) ABSTRACT

There is described a flexible oriented film (301) which acts a replacement for tear film, the film (301) having at least one tear susceptible line (307, 309) or pattern thereon (preferably weaker than the surrounding film), the film tearing substantially therealong when tearing is initiated therealong, characterised in that the line (307, 309) or pattern has substantially the same thickness normal to the film surface (gauge) as the rest of the film; and/or the film material therealong is substantially differently (preferably more) oriented (in extent and/or direction) to that in the rest of the film. The means for forming the line (307, 309) or pattern is preferably a laser (e.g. infra-red $CO_2$ laser) set at a sufficiently low power not to ablate material therealong but at a sufficiently high power to reorient the film therealong. A method of preparing such films (301) and packaging (721) (such as cigarette packs) overwrapped with such films (601) are also described.

22 Claims, 6 Drawing Sheets

FILMS, PACKAGING AND METHODS FOR MAKING THEM

This invention concerns films and packages produced therefrom which include means for facilitating their opening and/or applying line(s) and/or patterns thereto, as well as methods for producing such films.

Flexible polymeric films are widely used as packaging materials for a vast range of goods. Furthermore, a variety of synthetic polymers are used for producing such packaging materials, for example films made from synthetic polymers, such as (polyolefins [e.g. polyethylene and/or, polypropylene] polystyrene and/or polyesters) and/or natural polymers (such as cellulosic materials and/or biopolymers e.g. polylactic acid).

One particular packaging use for such films is as an overwrap for a variety of goods, for example for cigarette packets, video tapes, cookies etc., the films being sealed tightly over the goods. However, the very properties which confer desirable properties on the films as packaging materials, for example high strength and tear resistance, make such packages difficult to open because the films of which they are made are difficult to tear.

In order to facilitate the opening of such packages, so-called "tear tapes" have been provided which consist of a narrow strip of a polymeric film adhered to internal surface of the packaging film, a tab of the tear tape being left free on the outside of package to facilitate its opening. The package can then be opened by pulling the tear tape through the packaging film.

Although tear tapes can be a good and efficient way of opening such packages, applying the tape to the packaging film adds to the total cost of the packages. Furthermore it can still be difficult to open such packages as the end of the tape is often difficult to find. Therefore it has been proposed instead to provide inherent in the film other means of opening a pack, such as one or more lines of weakness on the film. Two lines are generally preferred to define a film strip of sufficient width to enable ease of grasping, removal and hence opening of the pack.

It has previously been known to use lasers to ablate and/or burn off a thickness of film to create a line of weakness along which the film can be torn. For example such techniques are described in U.S. Pat. No. 3,909,582; U.S. Pat. No. 5,630,308 (both American Can). U.S. Pat. No. 5,010,325 and U.S. Pat. No. 5,010,231 (both LPF) describe methods which use a laser which can be tuned to emit a given wavelength to better match the incident radiation to the film being scored. However such tunable lasers remain only research tools which are not available commercially making such a technique impractical on an industrial scale as well as very expensive. It is also known to use a laser or other means to create a line of perforations in a film (e.g. where a laser removes at various points along the film either the whole thickness through of the film to form a hole or some substantial proportion of material to form a well or indent in the film surface). Such perforations may also act as a tear line to aid opening of a pack wrapped in such a film.

The prior art methods of using lasers to score and/or perforate film have many disadvantages. The laser actually removes a layer of film thickness to weaken the film. Thus upper coats or layers are removed which can adversely effect other film properties in the treated area (e.g. water vapour and/or oxygen permeability). As the film surface is vaporised by the laser, potentially hazardous and/or noxious polymer vapour is produced which requires expensive and complicated associated equipment to extract the fumes. It can be difficult to control the laser position so that it only cuts through a partial section of an already very thin film.

Furthermore physically removing significant amounts of material from the film surface can lead to another major disadvantage. Firstly the weakened line is thinner than the surrounding film which creates a furrow in the film surface. Secondly during laser ablation large amounts of film material are thrown up either side of the score line which then condenses onto the film alongside the line. Melting of the film may also cause film polymer to flow across the film surface adjacent to the line. Both these effects tend to form ridges parallel to and either side of each score line. Thus tear lines made by prior art methods have pronounced furrows and ridges when the film is see in cross-section (e.g. see FIG. 2 herein).

Such an uneven cross-sectional profile whilst not necessarily readily seen by the unaided naked eye on a single sheet can nevertheless cause problems when a film is wound onto large reels to form rolls of film comprising many thousands of sheets of film laid on top of one another. Industrial sized rolls of prior art film with such laser scored tear lines show very pronounced ridges and furrows around the outer surface of the roll (e.g. see FIG. 3 herein). These correspond to the cumulative effect of the underlying ridges and furrows of the tear lines in each film sheet and have many undesirable effects. It is difficult to use such rolls in applications requiring precise positioning of the film web. The ridges and furrows provide an uneven surface for further coating, finishing and printing. The film is also stretched over the ridged areas when wound around a reel which can create undesired physical changes in these areas as some film properties such as heat shrink and optical properties are altered by stretching. For applications such as over-wrapping where the film is heat shrunk around a pack (e.g. tobacco product), any differential stretching in the film can lead to disadvantages such as areas of looseness around the pack; an imperfect seal; areas of variable opacity and/or an unsightly pack. Thus current laser scored tearable films exhibit unevenness to an extent which is unacceptable when the film is wound onto a roll.

It would be desirable to find a method of providing a means more readily to tear a film which is integral to the film and which eliminates or reduces some or all of the preceding disadvantages with prior art films.

The applicant has surprisingly discovered that tear susceptible line(s) and/or pattern(s) can be created in an film without creating large unevenness in the film gauge. Line(s) and/or pattern(s) in the film can also be created which have other uses as well as, or instead of, to facilitate tearing of the film.

Therefore according to the present invention there is provided a flexible optionally polymeric film having at least one line(s) and/or pattern(s) thereon characterised in that the film material within the line(s) and/or pattern(s) has a substantially different orientation to material in the rest, of the film.

As used herein differences in orientation between two compared regions of film may denote a difference in the extent of orientation (such as degree of order in the film material(s)) and/or difference(s) in the direction(s) of orientation (such as alignment(s) of film material(s), for example polymer chains and/or crystals) within the film.

Preferably the line(s) and/or pattern(s) lines have substantially the same gauge as the rest of the film.

Preferably the film tears substantially along the line(s) and/or pattern(s) when tearing is initiated therealong. However it will be appreciated that if the difference in orientation between the material within the line(s) and/or pattern(s) and the material in the rest of the film is insufficient to facilitate ready tearing therealong, such line(s) and/or pattern(s) may nevertheless be created thereon for other purposes such as to create aesthetic and/or other properties therealong. For example the film material therealong may be made more susceptible and/or resistant to future treatment(s) of and/or coating(s) on the film and/or the visual appearance of the film therealong may be selectively altered e.g. due to changes in opacity, different wavelengths scattered etc.

In another aspect of the present invention there is provided a flexible optionally polymeric film having at least one tear susceptible line(s) and/or pattern(s) thereon characterised in that the line(s) and/or pattern(s) lines have substantially the same gauge as the rest of the film.

As used herein tear susceptible line(s) and/or pattern(s) refer to line(s) and/or pattern(s) on the film which preferentially tear therealong due to the properties of the film therealong compared to the rest of the film. For example a tear susceptible line or pattern may comprise material which is mechanically weaker (e.g. due to treatment) than the material in the rest of the film.

Preferably the film material within the tear susceptible line(s) and/or pattern(s) has a substantially different orientation to material in the rest of the film.

More preferred films are those which the material in the line(s) and/or pattern(s) has a substantially different orientation to material in the rest of the film and the line(s) and/or pattern(s) have substantially the same gauge as the rest of the film.

As used herein gauge denotes the mean thickness of a film (or specified region of film) measured normal to the film surface.

Preferred films of the invention comprise line(s) and/or patterns(s) that are substantially free from ridges (or comprises only very small ridges) along the edges thereof compared to the; substantial ridges seen along the edges of tear lines of prior art films. Tear susceptible line(s) and/or pattern(s) prepared as described herein optionally exhibit less mechanical strength (i.e. weakness) in the direction of the line without removing significant amounts of material therealong. As little or no material is removed then very little if any furrowing is seen and any surface coatings can remain largely intact. As large volumes of polymer fumes are not generated there is also no need for extraction equipment. Thus the method of the present invention can be used using readily available equipment and without requiring extensive modification to conventional production lines for film webs.

In one embodiment of the present invention it has been surprisingly found that line(s) and/or patterns (optionally tear susceptible) can be created in an oriented thermoplastic polymer film by focussing onto the web a conventional $CO_2$ laser at low power levels insufficient to ablate polymer from the surface. Without wishing to be bound by any mechanism it is also believed that the laser has sufficient power to heat the film along the line and alter the orientation of the polymer chains therein (for example increasing orientation in the direction in which the laser is applied e.g. MD). It is also observed that if the film web stays substantially within a region close to the laser focal plane sufficient change in orientation will occur to create an effective tear susceptible line. There is a reasonable tolerance permitted in the relative positioning of the laser with respect to the film web, which is useful when dealing with web “chatter” where the plane of the film web is displaced by small amounts normal to the film surface as the web passes through the machine. This compares favourably to prior art methods of laser scoring where the positioning of the laser beam relative to the web is much more critical if one is to remove material from only a part of the thickness of an already very thin film.

Preferred films of the invention comprise oriented material, more preferably oriented polymeric material and most preferably biaxially oriented polymer. Preferably the material comprising the line(s) and/or pattern(s) herein is substantially more oriented than that the optionally oriented material comprising the rest of the film. More preferably the film material therealong is more oriented in one direction (e.g. MD) compared to the material in the rest of the film. Alternatively the line(s) and/or pattern(s) herein may be less oriented the rest of the film, for example comprise substantially randomly and/or unoriented material.

It will also be appreciated that the line(s) and/or pattern(s) as described in the present invention herein may comprise in whole or in part regions which are substantially continuous. Preferably the line(s) and/or pattern(s) herein exist substantially across the full the width of the film for example as measured in the transverse direction (TD) if the line(s) and/or pattern(s) herein are created in substantially in the MD. However the line(s) and/or pattern(s) herein may also comprise in whole and/or in part, regions which are substantially discontinuous. More preferably there may comprise at regular intervals a plurality of spots and/or dashes of film having material whose orientation has been altered therein such that the line(s) and/or pattern(s) herein is delineated on the film. Continuous line(s) and/or pattern(s) could for; example be formed by a continuous and/or a pulsed laser with a high pulse frequency. Discontinuous line(s) and/or pattern(s) could for example be formed by a pulsed laser where the pulse frequency is suitably matched to the speed at which the film web moves past the laser.

The invention herein preferably comprises line(s), region(s) and/or pattern(s) which are tear susceptible (e.g. weakened) and therefore especially useful as a tear guide for opening the film and/or for removing a defined region of film to create a shaped opening therein. However as well as, or optionally instead of, this tear susceptibility, suitable means (such as a laser at very low power) may also be used to define line(s), region(s) and/or pattern(s) on the film which are more or less susceptible to other subsequent treatments thereof and/or coatings and/or layers thereon. For example coatings may differentially adhere (or not adhere) to the treated region(s) compared to the rest of the film. This allows formation of line(s) and/or pattern(s) on the film with many different properties.

The invention further provides a method for creating, in a flexible optionally polymeric film, at least one line and/or pattern thereon so the film will tear substantially along the line(s) and/or pattern(s) when tearing is initiated therealong; characterised in that the method comprises the step of: directing onto a web of film a means to make the line(s) and/or pattern(s) susceptible to being torn therealong without removing significant amounts of material therefrom so the line(s) and/or pattern(s) have substantially the same gauge as the rest of the film.

Another aspect of the invention provides a method for creating, in a flexible optionally polymeric film, at least one line and/or pattern thereon so the film along the line(s) and/or pattern(s) is susceptible or resistant to further treatment; characterised in that the method comprises the step of directing onto a web of the film a means to differentially to orient material along the line(s) and/or pattern(s) so the material therealong has a substantially different orientation (optionally is more ordered) than material in the rest of the film and the line(s) and/or pattern(s) have substantially the same gauge as the rest of the film.

A still further aspect of the invention provides a method for creating, in a flexible optionally polymeric film, at least one line and/or pattern thereon so the film will tear substantially along the line(s) and/or pattern(s) when tearing is initiated therealong; characterised in that the method comprises the step(s) of:

(a) directing onto a web of the film a means differentially to orient material along the line(s) and/or pattern(s) so the material therealong has a substantially different orientation (optionally is more ordered) than material in the rest of the film; and/or (b) directing onto a web of film a means to make the line(s) and/or pattern(s) susceptible to tearing therealong without removing significant amounts of material therefrom so the line or lines have substantially the same gauge as the rest of the film.

In a preferred method of the invention steps (a) and (b) are simultaneous rather than sequential; and more preferably the differential orienting means of (a) and the tear susceptibility means of (b) and are the same means (i.e. one method achieves both effects).

It will be appreciated that when determining whether any change has occurred in the film gauge along the line(s) and/or pattern(s) herein (e.g. created as described) many criteria should be considered. For example one could assess just the thickness of the line itself (the degree of furrowing) and/or one could look at the boundary region between the line and the rest of the bulk film as this is where undesirably large ridges may form. Thus preferred films of the present invention may exhibit reduced (more preferably substantially no) furrows (thinning in the line itself) and/or reduced (more preferably substantially no) ridges (peaks either side of the line). Most preferred films show a effect in reducing and/or eliminating both the ridge and the furrow not just one of them. More preferred films of the invention will have a substantially flush cross-section (i.e. a substantially uniform gauge across the whole width of the film) taking into account normal variability in gauge due unavoidably to the nature of conventional processes used to form films and ignoring the extreme edges of the web (where for example stenter clips may be attached) as these edges may well be trimmed from the final film. It will also be appreciated that ridges and furrows may be manifest on one or both sides of the film surface. However it is a preferred advantage of the films of the present invention that if present as well as being small ridges and furrows tend to occur on one side of the film only, generally the side of the film incident to the means used to generate the line or lines. Prior art methods for producing tear lines lead to films having much larger ridges and furrows which generally occur on both sides of the film.

Any suitable means to increase the order (i.e. reduce the entropy and/or increase orientation) of the film material along the line(s) and/or pattern(s) herein may be used. Alternatively orientation can be scrambled, reduced and/or randomised along the line to also create a line of discontinuity (phase change) which may also act as a tear susceptible line if required and/or make the line(s) and/or pattern(s) differentially susceptible or resistant to further treatment(s), layer(s) and/or coating(s). Such means may comprise for example focussed chemical or radiation treatment (e.g. heat) such as an infra-red laser. Conveniently a standard industrial $CO_2$ laser of wavelength 10.6 microns (1 micron=1 μ=1 μm=$1\times10^{-6}$ m) may used as this is readily available. Although for certain common film materials such as polypropylene the wavelength of a $CO_2$ laser is not readily adsorbed as the process of the present invention requires very low levels of power a standard mass produced $CO_2$ laser is more than adequate. Thus it is an advantage of one embodiment of this invention that such cheap and readily available lasers can be used. However it will be appreciated that in the method of the present invention any suitable lasers of other more optimal wavelength(s) for the film material may be used (and/or tuneable lasers) as and when such lasers become more commercially available at a reasonable cost. If treatment and/or creation of the line(s) and/or pattern(s) herein is by laser it is at a power insufficient to remove film material (e.g. by ablation).

Alternatively a method of the present invention comprises the step of/directing onto at least one line and/or pattern selected on a web of a polymeric film oriented in at least one (preferably two) direction(s), a tear susceptibility means which selectively alters (preferably increases) film orientation along the line(s) and/or pattern(s) but not in the rest of the film; such that the tear susceptibility means does not remove significant amounts of film therefrom;

to form in the resultant film tear susceptible line(s) and/or pattern(s) thereon having substantially the same gauge therealong as the rest of the film.

Alternatively a method of the present invention comprises the steps of (i) directing onto at least one line and/or pattern selected on a web of a flexible, substantially unoriented polymeric film, a tear susceptibility means which selectively inhibits or substantially prevents film orientation along the line(s) and/or pattern(s) but not in the rest of the film; such that the tear susceptibility means does not remove significant amounts of film therefrom; and (ii) subsequently orienting the rest of the film such that the film remains substantially non-oriented or less oriented along the line(s) and/or pattern(s), to form in the resultant film tear susceptible line(s) and/or pattern(s) thereon having substantially the same gauge therealong as the rest of the film.

Any suitable means to inhibit or prevent orientation as required may be used. A physical barrier such as a mask and/or coating may be used to block or inhibit subsequent treatment to orient the rest of the film and/or make the film more susceptible to subsequent orientation. Alternatively or as well, the selected line and/or pattern on the film can be treated to make the film therealong more resistant to subsequent orientation.

The treatments used to create the line(s) and/or pattern(s) on films of the invention, can by applied by suitable directable means such as, patterned lithographic masks, jets (for example coatings or chemical treatments applied by ink jet printer) and/or by radiation (for example electromagnetic e.g. IR, visible, UV and/or particulate e.g. electron beam [EB]). The treatments which may be used can be those which act directly to alter (e.g. improve, scramble or randomise) orientation in the treated area (e.g. by use of heat, preferably focused laser beam). Alternatively, or as well, the treatments may act to inhibit or enhance subsequent orientation of film material in the selectively treated area (e.g. by cross-linking or denaturing the film polymer). Preferably the treatment parameters should be set so that the tear susceptible line(s) and/or pattern(s) in the final film have substantially the same thickness (gauge) as the rest of the film. More preferably the tear susceptible line(s) and/or pattern(s) are weaker than the rest of the film.

The advantage of using a focussed laser directed normally to the film surface is that as the size, of the focal beam is comparable to or less than the thickness of the a typical film web through which the laser beam passes, the properties of the film are effected (i.e. polymer chain orientation is altered) simultaneously throughout the film thickness within the selected line(s) and/or pattern(s) not just the on the surface. The use of a laser to create a very narrow line minimises any effect on the overall performance of the piece of film used. This also permits some greater degree of tolerance in positioning of the film web in a plane normal to the incident laser beam (e.g. some flexing of the film can occur) without substantially effecting the alteration of polymer orientation within the selected line(s) and/or pattern(s).

It is preferred to improve, enhance or re-direct orientation of polymer chains along line(s) and/or pattern(s) on a film which has previously been oriented as this is less likely to produce handling problems than selectively orienting material along the line(s) and/or pattern(s), especially if orientation achieved by stretching, as otherwise the film may break or tear during processing. However if film orientation can be achieved by some other method which requires less film handing (such a chemical or radiation treatment) it may then be practical to enhance orientation along the line(s) and/or pattern(s) herein by selectively orienting the material therealong before optionally orienting the rest of the film.

Because substantially no material has been removed from the line(s) and/or pattern(s) herein, they are substantially unridged (i.e. have a substantially flat, non-furrowed profile flush with the film surface when seen in cross-section through the film). Such line(s) and/or pattern(s) can be formed by any suitable means (such as those described herein) preferably where the material in the line(s) and/or pattern(s) is more oriented than that in the rest of the film.

Films of the invention may be tested by any suitable method to measure the degree of and the direction(s) of orientation within the line(s) and/or pattern(s) herein, for example polarimetry and/or Raman spectroscopy. Preferably the line(s) and/or pattern(s) herein are sufficiently differently oriented, more preferably more oriented, compared to the rest of the film that such a difference can be detected by at least one of these suitable methods.

Another aspect of the invention provides a package comprising at least one article wrapped in a flexible oriented polymeric film of the invention.

Another aspect of the Invention provides at least one article wrapped in a flexible oriented polymeric film of the invention.

Once the film has been sealed around the article, tearing of the film substantially along a tear susceptible line and/or pattern preferably occurs with peeling of the seal. The film can be heat or cold sealed around the article.

The film of packages of the present invention can be printed, and this preferably includes an indication of the position for initiating tearing of the film to open them.

If the line(s) and/or pattern(s) herein are tear susceptible it is preferred that the at least one of the line (s) and/or pattern(s) extend to the edge of the film on the package to assist tearing therealong. However, there can also be an advantage in having a cut extending from the edge of the film to assist in the initiation of a tear along the line(s) and/or pattern(s) herein.

Packages in accordance with the present invention can be opened easily in a similar manner to those using separately applied tear tapes, but the need for such tear tapes is avoided.

Although a single tear susceptible line can be used, so that the package can be opened by tearing it open substantially along this line, it is generally preferred for packages of the present invention to include at least a pair of such lines. Optionally the pair of lines are substantially mutually parallel and define a strip of film, which can be torn away from the rest of the film, much in the manner in which packages having a tear tape are opened but without the necessity for having such a tape.

When more than one tear susceptible line is used, the distance between the individual lines is not limited by the cost considerations which apply when separate tear tapes are used because tearing of films and packages in accordance with the present invention can be effected without the use of such tapes. However, it Is generally preferred that when two lines are used they be at least about one mm apart in order to facilitate being able physically to take hold of the end of the edge of the film when the package is to be opened and also to minimise the risk that tearing transfers from the two lines into only one when the package is opened. As will be appreciated, an unsealed tab extending from the edge of the film on the package will usually make this easier. However, the lines can be spaced considerably further apart, for example about 10 mm apart or more, but a preferred distance apart is in the range of from about 2 to about 6 mm.

It has been proposed hitherto to use coloured tear tapes In order to facilitate being able to see the end of the tape and thereby opening of the packages. The present invention achieves tearing open of the packages without the necessity of a tear tape, and so in a preferred embodiment of the present invention at least a portion of the film between a plurality (preferably two) tear susceptible lines and/or patterns herein is coloured, for example a coloured tear tab can be used rather than colouring the whole of the region of the film therebetween. Other suitable means could be used to indicate the position of the lines and/or patterns for example the means used to form them could be adjusted (or intrinsically) alter the optical properties of the film therealong; and/or in sequence or in parallel another method could be used to mark one or more region(s) defined between the plurality of lines and/or patterns.

As will be appreciated, to open a package by tearing along the tear susceptible line(s) and/or pattern(s) herein, generally requires a tear to be initiated from an exposed edge of the film., This can be achieved by leaving an at least partially unsealed region at the edge of the film, and this is preferably achieved using a tab extending from one edge of the film. Although the line(s) and/or pattern(s) herein preferably extend to the edge of the film, tearing can start some distance from the edge of the film, for example by providing a slit or notch (e.g. V or U shaped) in the edge of the film which extends towards and possibly into the line(s) and/or pattern(s).

The (optionally very narrow) lines herein do not involve perforation of the film as this could seriously reduce the barrier properties of the film. Unlike prior art methods the film can be treated along line(s) and/or pattern(s) in a manner sufficient to facilitate tearing therealong without reducing the thickness of the film at all or to any great extent. Various methods as described herein can be used to effect the tear susceptibility of the film (e.g. by selective weakening) without substantial thinning, if any. Preferred methods can involve non contact (e.g. thermal) and/or mechanical means which cause either more orientation along the line(s) and/or pattern(s) or conversely less orientation in the rest of the film. The line(s) and/or pattern(s) herein can be continuous or discontinuous, but when they are discontinuous they should still be such that a tear once started will propagate essentially along the line(s) and/or pattern(s) and thus move from one treated (e.g. weakened) section to the next.

It is generally preferred that the tear susceptibility arises because after treatment (e.g. as described herein) material comprising the line(s) and/or pattern(s) is weaker (e.g. has a lower tensile strength) than the material comprising the surrounding film.

An example of a non contact means for forming the line(s) and/or pattern(s) herein is the a non ablative laser which treats the film therealong. An example of a mechanical means is a suitably controlled blade or roller which applies pressure to the film surface. These means neither puncture the film nor remove substantial amounts of material therefrom. It is believed that they act entirely or mainly by altering orientation of the film material within the treated line(s) and/or pattern(s) as the film therealong is subjected to, respectively, heat or mechanical pressure. Lasers of suitable power have enabled a particularly good tearing to be achieved along the lines of laser treatment. However, using blades to apply pressure can also provide satisfactory results, as can a roller working in an appropriately shaped groove. An advantage of using lasers compared with methods such as blades and/or grooved rollers is that the properties of the treated line (e.g. degree of orientation change and/or weakening) is usually relatively easy to control by adjustment of laser settings (such as power and position of the focal plane) whereas the mechanical tolerances required to produce changes in line(s) and/or pattern(s) by mechanical means are often more difficult to control, especially as it is desired that substantially no film material is to be removed by the treatment.

The direction of the line(s) and/or pattern(s) herein relative to the film itself is in general unimportant, particularly with films having balanced properties. However, it is usually convenient to make these line(s) and/or pattern(s) along the direction in which the film is; manufactured (MD), and this can be particularly conveniently effected during operations subsequent to the film production process, for example during slitting of a larger rolls of film to produce reels of film which are to be used on a packaging machine.

It is also possible to create line(s) and/or pattern(s) herein in any configuration (especially with a laser or ink-jet printer head). For example line(s) and/or pattern(s) herein that are tear susceptible can be created on the film to define regions and shapes which can be readily cut, torn, pressed out, or otherwise removed and or separated (in whole of in part) by the end user. The tear susceptible line(s) and/or pattern(s) herein have applications in other areas, not just packaging, for example to create complicated film shapes and patterns, security features; tear susceptible lines for books of documents (such as tickets) etc.

The film and/or sheet in which line(s) and/or pattern(s) herein are introduced according to the present invention may be any suitable substrate, such as any well known sheeting material(s), preferably the material of which can be oriented in at least one direction and therefore also de-oriented along a line thereon. Suitable sheeting materials may comprise any of the following: paper, synthetic paper, woven fabric, non-woven fabric, ceramic sheet, metallic fibre sheet, metallised sheet or film, metallic foil, metallic plate; films made from organic polymers, preferably biopolymers, more preferably films made from one or more suitable carbohydrates; polysaccharides (such as starch, cellulose, glycogen, hemicellulose, chitin, fructan inulin; lignin and/or pectic substances); gums; proteins, optionally cereal, vegetable and/or animal proteins (such as gluten [e.g. from wheat], whey protein, and/or gelatin); colloids (such as hydrocolloids, for example natural hydrocolloids, e.g. gums); polylactic, polygalactic and/or cellulosic films (e.g. microbal and/or regenerated cellulose film)]; thermoplastic films; polymeric films (for example films comprising: polyolefins [e.g. polypropylene and/or polyethylene] polyurethanes, polyvinylhalides [e.g. PVC], polyesters [e.g. polyethylene terephthalate—PET], polyamides [e.g. nylons] and/or non-hydrocarbon polymers); and/or multilayer and/or composite sheets formed by any suitable combinations and/or mixtures of thereof.

It will be appreciated that in the end any sheet substrate can be used to form a sheet of the present invention provided that line(s) and/or pattern(s) herein can be introduced thereto without significant removal of material from the sheet such that the disadvantageous ridge and furrow effects in a tear susceptible line or pattern (e.g. line or pattern of weakening) can be avoided or substantially eliminated. Thus preferred sheet substrates are those in which differential orientation can be introduced between the bulk of the sheet and the line(s) and/or pattern(s) herein. More preferred sheets are those which comprise constituent materials which can initially be substantially oriented in one or more directions along the sheet and then subsequently wholly or partially re-oriented by action of a suitable means such as a laser along a line on the sheet to create line(s) and/or pattern(s) herein without significant removal of material.

Preferred films of the present invention may be produced from a variety of synthetic polymers, for example may be polyolefin based films, e.g. polyethylene based, polypropylene based or made from polystyrene, or they may be polyester based films. Furthermore, films of the present invention may be in the form of monolayers of a particular polymer, although preferred films comprise two or more layers which can be formed by coextrusion and/or by coating.

The films are preferably heat sealable, and it is generally preferred that when they have been heat sealed the heat seals themselves have peel strengths less than the force required to tear the film along line(s) and/or pattern(s) herein in order to facilitate propagation of these tears through the heat seal and then into non-sealed regions of the film around the packaged articles. If desired, cold seals can be used to seal the packages, and again it is preferred that such seals should peel to allow tearing along line(s) and/or pattern(s) herein to propagate through these seals.

Biaxially oriented polypropylene (BOPP) films are preferred for producing sheets, films and/or packages in accordance with the present invention. It is more preferred that the BOPP films have substantially balanced physical properties, for example as can be produced using substantially equal machine direction and transverse direction stretch ratios. Although sequential stretching can be used, in which heated rollers effect stretching of the film in the machine direction and a stenter oven is thereafter used to effect stretching in the transverse direction, it is generally preferred to use biaxially oriented films which have been produced by simultaneous stretching, for example using the so-called double bubble process or a simultaneous draw stenter. The machine direction and transverse direction stretch ratios are preferably in the range of from 4:1 to 10:1, and more preferably from 6:1 to 8:1.

The films used in accordance with the present invention can be of a variety of thicknesses according to the requirements of the packages which are to be produced. For example they can be from about 10 to about 120 microns thick, and preferably from about 14 to about 40 microns thick.

The tear susceptible line(s) and/or pattern(s) formed herein should exhibit properties (e.g. a degree of weakening therealong) which are sufficient to enable a tear once started to propagate substantially along the line(s) and/or pattern(s)

in which it has started without substantial deviation therefrom. Insufficient tear susceptibility will make it difficult if not impossible to starting a tear therealong. However excessive tear susceptibility (e.g. too much weakening) could result in unwanted opening of the packages during normal handling. As will be appreciated by those skilled in the art, different methods of achieving tear susceptibility of the films can result in different tearability.

Although packages in accordance with the invention can be opened by tearing the films substantially along tear susceptible line(s) and/or pattern(s) in the packaging film without the use of a tear tape, a tear tape can be used in conjunction with one or more such line(s) and/or pattern(s), for example to facilitate the tearing of films which are otherwise difficult to open with a tear tape, e.g. with particularly thick films or films made of polymers which are inherently resistant to tearing.

Unless the context indicates otherwise, the terms 'effective' and/or 'suitable' as used herein (for example with reference to the sheets, films, coatings, formulations, process, methods, uses, applications, products, materials, additives, compounds, monomers, oligomers, polymer precursors, polymers and/or resins described herein and/or used in, added to and/or incorporated in the present invention) will be understood to refer to those components which if used in the correct manner provide the required properties (such as an improved tear tape replacement film) to the present invention as described herein.

It will also be understood that any optional substituents that may be present on any repeat unit in any polymer described herein may be selected to improve the compatibility thereof with any other materials with which they may be formulated and/or incorporated to form the invention herein. Thus, the size and length of substituents may be selected to optimise the physical entanglement or interlocation with the resin or they may or may not comprise other reactive entities capable of chemically reacting and/or cross-linking with such resins.

Certain moieties, species, groups, repeat units, compounds, oligomers, polymers, materials, mixtures, compositions and/or formulations which comprise some or all of the invention as described herein may exist as one or more stereolsomers (such as enantiomers, diastereoisomers, geometric isomers, tautomers and/or conformers), salts, zwitterions, complexes (such as chelates, clathrates, crown compounds, cyptands/cryptades, inclusion compounds, intercalation compounds, interstitial compounds, ligand complexes, non-stoichiometric complexes, organometallic complexes, π-adducts, solvates and/or hydrates); isotopically substituted forms, polymeric configurations [such as homo or copolymers, random, graft or block polymers, linear or branched polymers (e.g. star and/or side branched polymers), hyperbranched polymers and/or dendritic macromolecules (such as those of the type described in WO 93/17060), cross-linked and/or networked polymers, polymers obtainable from di and/or tri-valent repeat units, dendrimers, polymers of different tacticity (e.g. isotactic, syndiotactic or atactic polymers)]; polymorphs [such as interstitial forms, crystalline forms, amorphous forms, phases and/or solid solutions] combinations thereof where possible and/or mixtures thereof.

The sheets of the present invention comprise and/or incorporates all such forms which are effective and/or suitable.

It is appreciated that certain features of the invention, which are for clarity described in the context of separate embodiments may also be provided in combination in a single embodiment. Conversely various features of the invention, which are for brevity, described in the context of a single embodiment, may also be provided separately and/or in any suitable sub-combination.

The term "comprising" as used herein will be understood to mean that the list following is non-exhaustive and may or may not include any other additional suitable items, for example one or more further feature(s), component(s), ingredient(s) and/or substituent(s) as appropriate.

Further and/or alternative features of the present invention are described in the claims.

Embodiments of films and a packs according to the present invention will now be described by way of example with reference to the accompanying drawings. Features in each drawing are given number labels with the numbering in each drawing starting at the next hundred (i.e. 1, 101, 201 etc). Similar and/or analogous features in each drawing are labelled by numbers separated by an whole number multiple of one hundred (e.g. features 1, 101 and 301 each refer to the base film in FIGS. 1, 2 and 4 respectively).

Various embodiments of the present invention will now be described by way of illustration only.

Figure 1:
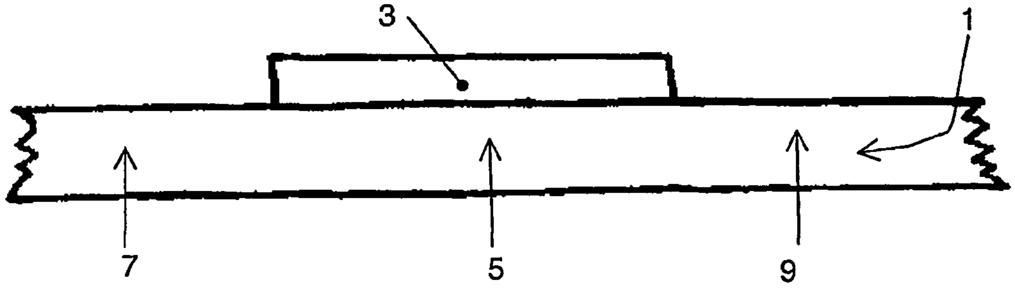
FIG. 1 is a section through a prior art packaging film with adhered tear tape.

Referring to FIG. 1, a heat sealable biaxially oriented polypropylene film (1) has a separate tear tape (3) adhered to a region (5) on the film (1) to form a line thereon in the MD. A tab (not shown) is attached to one end of the tear tape (3). When this film (1) is used to overwrap a cigarette pack (not shown) in a known manner the tear tape (3) is placed on the inner surface of the film (1). The tab is left free so when the tab is pulled, the tape (3) tears through the film (1) in regions (7) and (9) either side of the tape (3), to remove the strip of film (5) to which the tear tape (3) was attached. This enables the film (1) to be removed from the pack and the pack to be opened.

Figure 2:
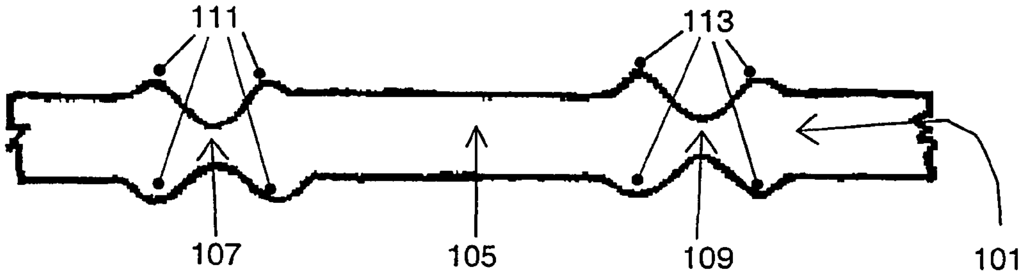
FIG. 2 is a section through a prior art packaging film with tear susceptible lines thereon having a ridge and furrow cross-section made using a prior art laser ablation method.

FIG. 2 shows another prior art heat sealable biaxially oriented polypropylene film (101) having lines (107) and (109) scored in the film (101) in the MD using a laser according to the prior art methods. As indicated in FIG. 2, the film (101) is of reduced thickness along the scored lines (107, 109) where material has been ablated by the laser beam, but it is of increased thickness on either side (111, 113) of these weakened lines (107, 109) where due to removal of material, ridge lines (111, 113) have formed. The portion (105) of the film (101) between the scored lines (107, 109) is of the same thickness as the rest of the film (101) as it has not been directly effected by the laser treatment. A tab (not shown) can similarly be attached to region (105) of the film and left free. Pulling the tab causes tearing to propagate along the scored lines (107, 109) in the film (101) to remove a strip of film (105). Thus a pack overwrapped with film (101) can be opened as described in FIG. 1.

Figure 3:
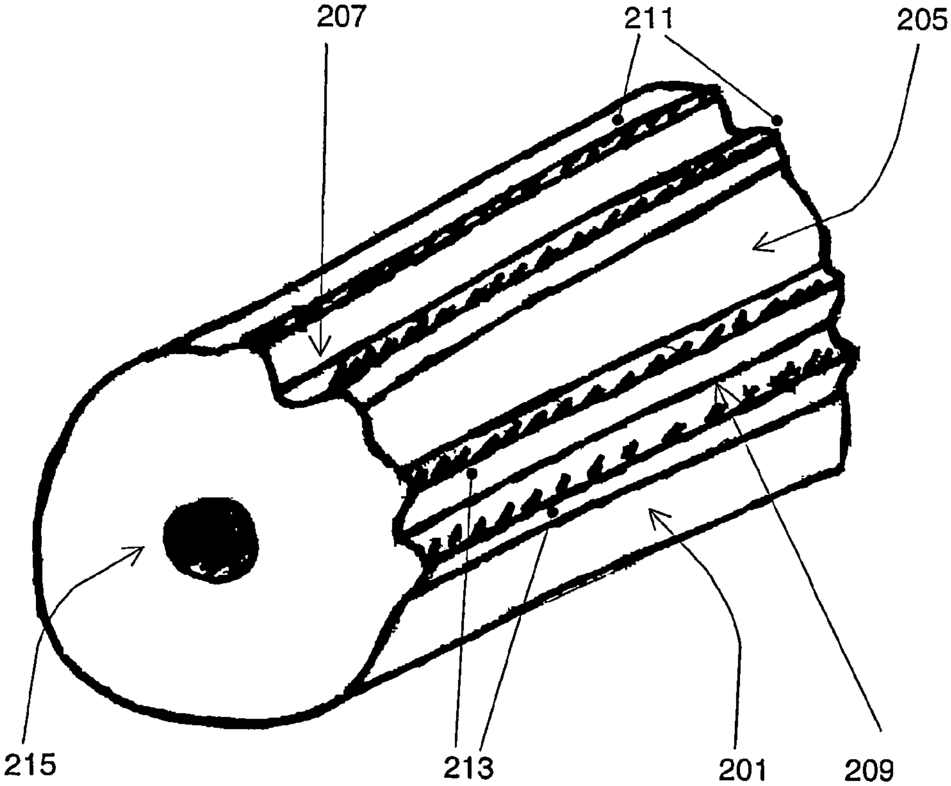
FIG. 3 is a roll of the prior art film illustrated in FIG. 2 which has been wound onto a drum showing a pronounced ridge of film on the surface of the film.

FIG. 3 shows a roll of film (215). A web of prior art film (201) as shown in FIG. 2 is wound around a drum in the MD to form a roll (215) of film in a conventional manner. The portions of film (201) of increased thickness (211, 213) either side of scored lines (207, 209) of reduced thickness are cumulatively superimposed on top of each other in a large roll (215) comprising many hundreds of turns of film. Thus a pronounced ridges (211, 213) and furrows (207, 209) can be seen on the surface of this prior art roll (215) either side of the strip of film (205). These ridges (211, 213) and furrows (207, 209) are highly undesirable for the reasons described herein as for example they can cause distortions and stretching in the film1).

Figure 4:
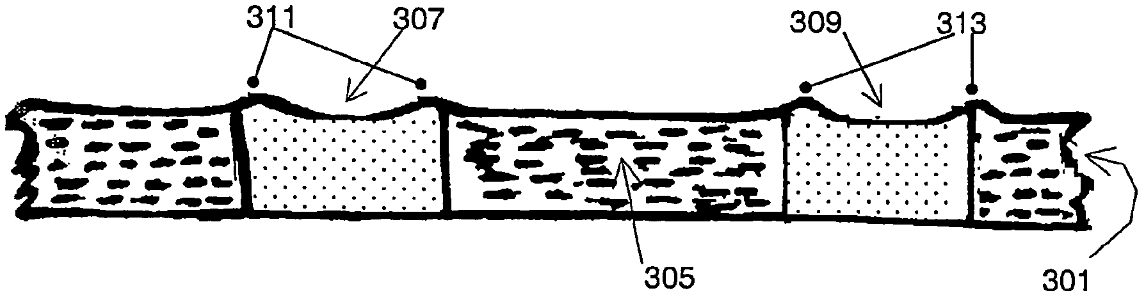
FIG. 4 is a TD section through a tear open portion of one embodiment of a film of the invention where the tear line has been formed by a low powered laser and very little material has been removed from the film.

FIG. 4 shows one embodiment of a heat sealable biaxially oriented polypropylene film of the present invention (301) having tear susceptible lines (307, 309) produced thereon which are weaker than the rest of the film (301). The lines were formed in the MD using a laser according to the method of the invention where only insignificant amount of film material has been removed. Unlike the prior art film shown in FIG. 2, the film (301) is of substantially, uniform thickness along the lines (307, 309) where the film material has been treated by the laser beam with only very small bumps (311, 313) seen either side of the lines (307, 309). Instead the orientation of the film (301) along lines (307, 309) has been increased in the MD due to the action of the heat of the laser beam. This increase in orientation is indicated by the shading of these regions (307, 309). The portion (305) of the film (301) between the tear susceptible weakened lines (307, 309) is of substantially the same thickness, orientation and strength as the rest of the film (301) as it has not been directly effected by the laser treatment. A tab (not shown) can similarly be attached to region (305) of the film and left free. Pulling the tab will cause a tear to propagate along the lines (307, 309) to remove a strip of film (305) so defined. Thus a pack overwrapped with film (301) can be opened in a similar manner to that described in FIG. 1. It will also be appreciated that in another embodiment of the invention only one tear susceptible line [rather than the two lines (307, 309) shown in FIG. 4] need be introduced in the film also to permit an overwrapped pack to be opened if a suitable tab was attached to the end of the single line.

Figure 5:
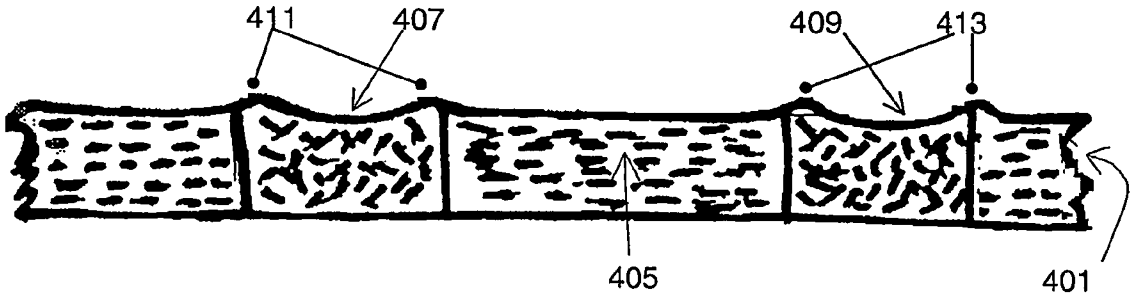
FIG. 5 is a TD section through a tear open section of another embodiment of a film of the invention.

FIG. 5 shows another embodiment of a heat sealable biaxially oriented polypropylene film of the present invention (401) analogous to that shown in FIG. 4 having lines (407, 409) produced in the film according to a method of the invention. However, unlike the film in FIG. 4, the orientation of the film (401) along lines (407, 409) has been scrambled (randomised) throughout the thickness of the film and this de-orientation is indicated by the shading of these regions (407, 409).

Figure 6:
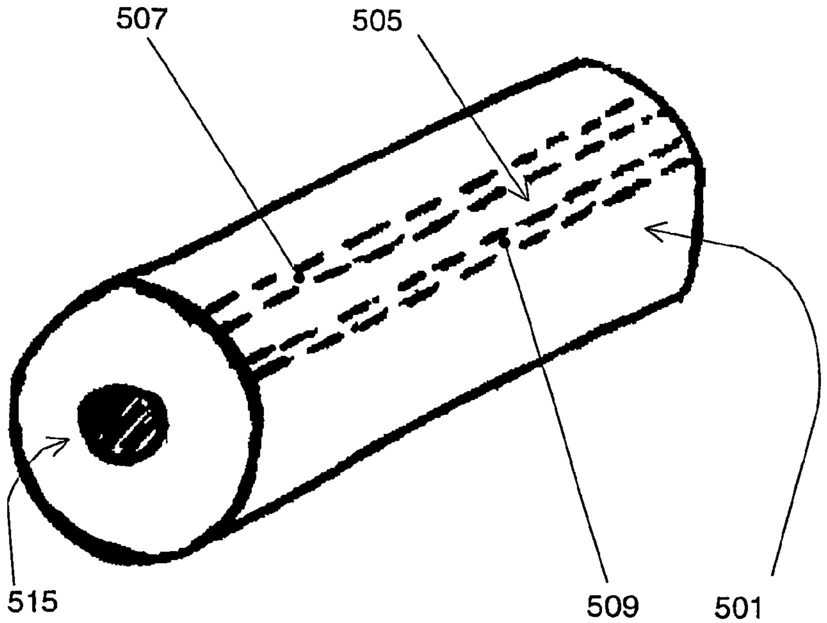
FIG. 6 is a roll of the film of the invention illustrated in FIG. 4 which has been wound onto a drum showing a substantially flat outer surface on the film roll.

FIG. 6 shows a web of the film (501) of FIG. 4 wound around a drum in the MD to form a roll (515) of film in a conventional manner. The tear susceptible lines (507, 509) (formed as described herein in the MD along the film) have substantially the same thickness as the rest of the film (501) and the strip of film (505) defined between the lines (507, 509). Thus when many layers of film are cumulatively superimposed on top of each other in a large roll (515) comprising many hundreds of turns the outer surface of the roll remains substantially even because there are little or no ridges or furrows along the lines (507, 509). Thus little or no distortion or stretching of the film (501) is observed when the web is wound onto the roll (515).

Figure 7:
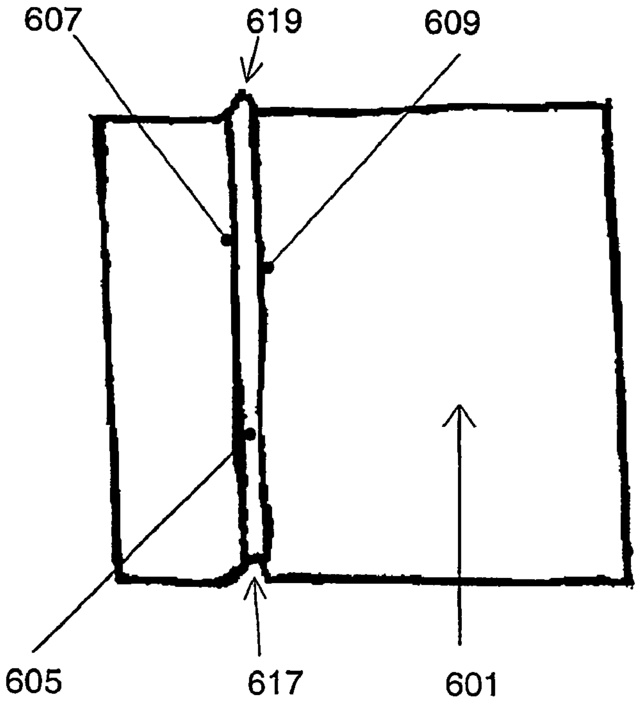
FIG. 7 shows a piece of film of FIG. 4 shaped for overwrapping a cigarette pack with a tab for ease of pulling along a strip defined by two tear susceptible lines.

FIG. 7 shows a film (601) of the invention as shown in cross-section in FIG. 4, which has been shaped to be more readily useful in overwrapping a pack. Specifically a notch (617) has been provided at one end of the strip of film (605) between the two tear susceptible lines (607, 609) to allow for greater ease in initiating a tear along these lines as described herein. It will be appreciated that other suitable means could be also be used to aid tear initiation therealong such as a tab (619) shaped and/or attached to the region (605). In preferred films of the invention either one or both of a tab or notch may be used to aid tearing.

Figure 8:
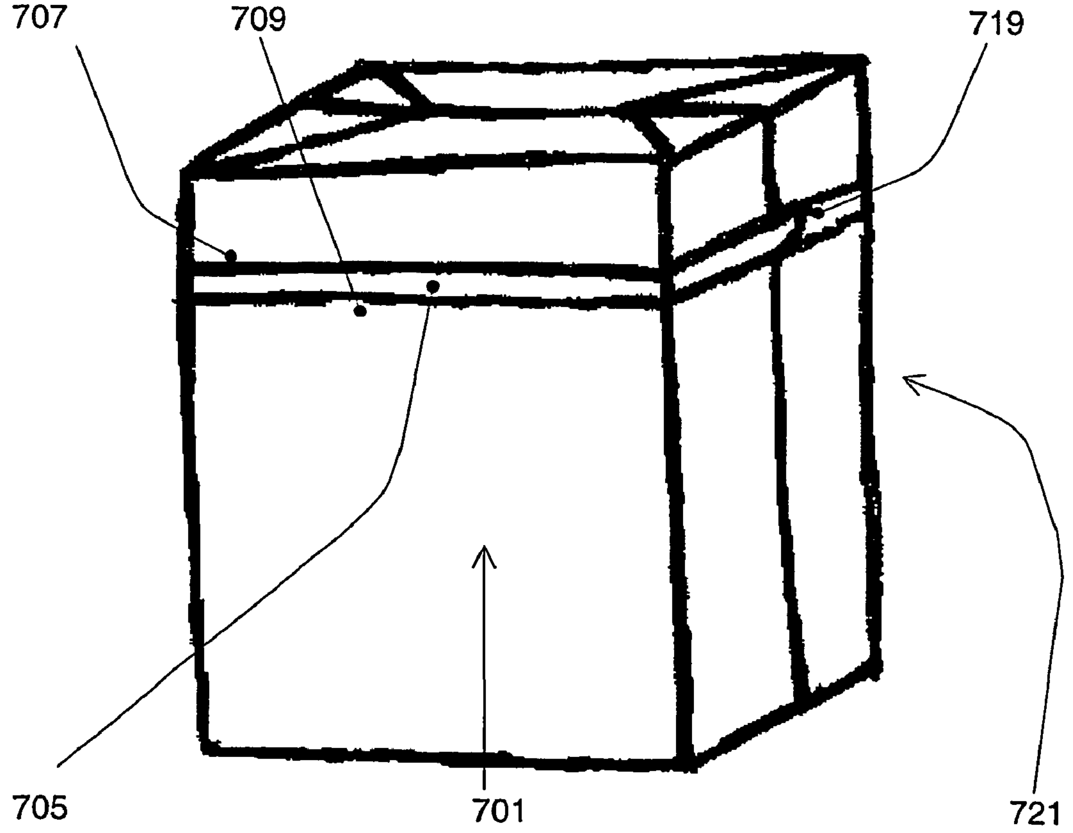
FIG. 8 is a perspective view of a cigarette pack overwrapped with the film of FIG. 4.

FIG. 8 shows a cigarette pack (721) overwrapped with a film of the invention (701) having a tearable strip (705) thereon defined by the tear susceptible lines (707, 709) and a tab (719) attached to the strip (705) to aid removal thereof and hence unwrapping of the film (701) from the pack (721).

To illustrate and explain the invention the following non-limiting examples of a film of the invention and (as a comparison) a prior art film were prepared as follows:

BOPP Film

A three layer polymeric tube was formed by coextruding a core layer of polypropylene (also as referred to herein as PP) homopolymer with a layer of medium density polyethylene on each side of the core layer. The tube was cooled and subsequently re-heated before being blown to produce a three layer biaxially oriented polypropylene (also referred to herein as BOPP) film having a core layer which was 18.7 μm thick and two outer layers which were each 0.3 μm thick, the film itself being 19.3 μm thick. Different methods were used to create tear susceptible lines on this conventional BOPP film.

Comp A

As a comparative example a single laser ablated line (107) was scored in the machine direction (MD) along a conventional BOPP film (101) prepared as described above using the conventional method of scoring with a high powered laser. Fumes of vaporised PP were observed where the laser beam hit the film (101) indicating that significant amounts of PP was being burnt from the surface of the film (101) as the weakened score line (107) was being formed.

EXAMPLE 1

A web of a BOPP film (301) prepared as described above was fed at a speed of 200 ft per minute past a 50 W $CO_2$ laser of wavelength 10.6 microns. The laser beam was split into two to reduce the power of the laser at the web to about 7 W. A single laser beam was focussed onto the film web to heat the film (301) along a single line (307) in the MD in a manner sufficient to scramble the orientation of the PP therealong without burning off significant amounts of the polymer. The result was a weakened line (307) on the film (301) which could be torn therealong by hand pressure. It was found that for this laser power settings of between about 40% and about 65% produced usable tears in the film. If the power was too high material began to be ablated from the film surface and if too low the laser power did not scramble film orientation sufficiently to produce enough weakening for an easy tear. The aforementioned films (301) were produced with a pair of tear susceptible lines (307, 309) thereon and such films could be wound up onto large reels without noticeable ridging thereon.

Results

Referring to FIGS. 9 to 12 herein, photographs of various prior art films and films of the present invention were taken under magnification. The film was sandwiched between a suitable embedding material and sliced in the TD to allow a cross-section through the film to be seen.

Figure 9:
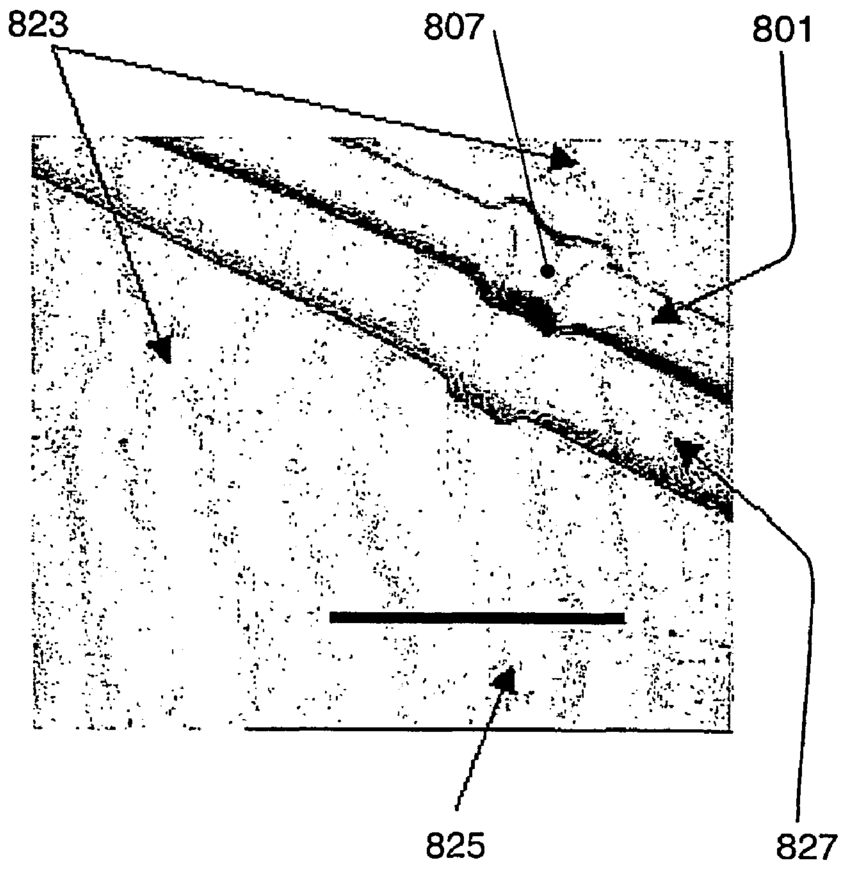
FIGS. 9 to 12 are photos of TD sections through films with tear susceptible lines which illustrate the difference between prior art laser scored films of Comp A herein (FIGS. 9 and 10) and the films of Example 1 herein (FIGS. 11 and 12).

FIG. 9 is a photograph taken under normal transmitted light of the prior art BOPP film Comp A (801) sandwiched within an embedding material (823). A scale bar (825) 100 microns in length superimposed on the photograph to indicate the degree of magnification of the image. On one side there is an air gap (827) between the film and the embedding material. Pronounced ridges and furrows can be seen at both the top and bottom surfaces of the film along the laser scored line of weakening (807) and there is significant thinning of the film therealong.

Figure 10:
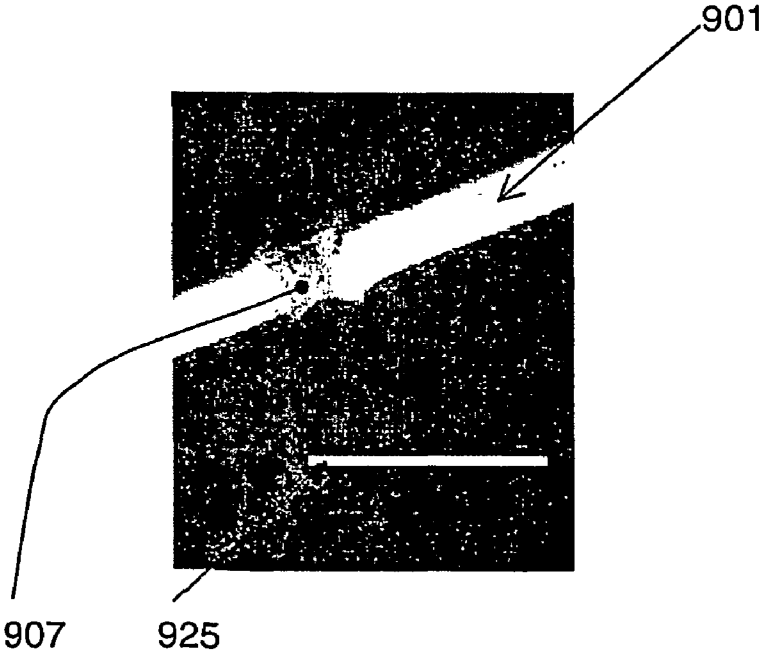

FIG. 10 is a photograph taken under transmitted cross polarised light of the same sample of Comp A at the same magnification (where 925 denotes a scale bar also 100 microns long). The orientation of material within the film (901) and the tear susceptible line (907) can be seen as largely the same, as the line (907) appears grey and there is a largely uniform intensity of illumination across the film section. The low contrast between the amount of polarised light transmitted through the tear susceptible line (907) and the rest of the BOPP film (901) is because the polymer chains within the line (907) and film (901) are aligned in substantially the same direction with respect to the plane of polarisation of the incident polarised light.

Figure 11:
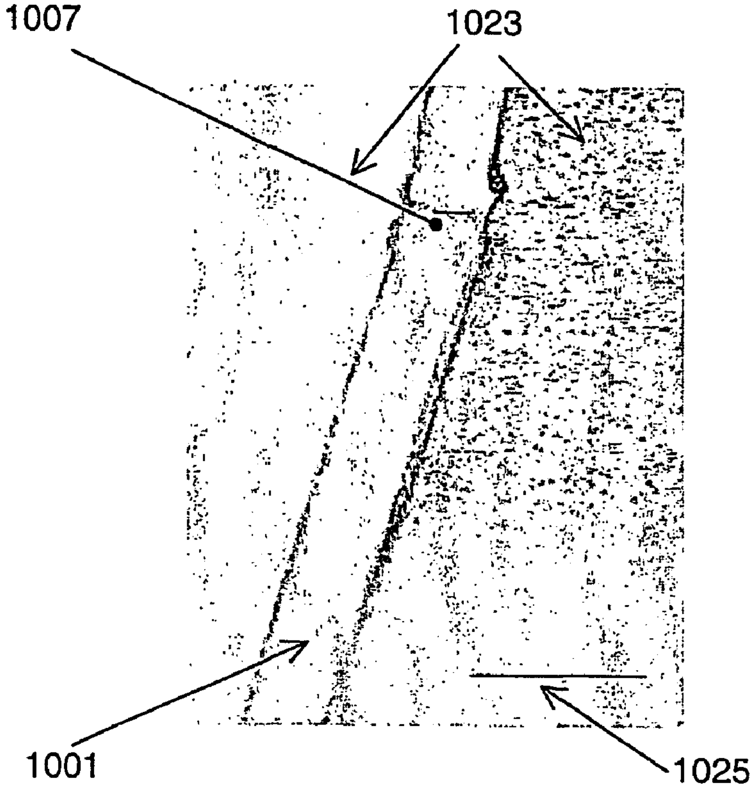

FIG. 11 is a photograph of the BOPP film of Example 1 herein. The photograph was taken under normal transmitted light and shows a cross-section through the film (1001) sandwiched within an embedding material (1023). A scale bar (1025) 50 microns in length is superimposed onto the photograph to indicate the degree of magnification of the image. This photograph shows that the film has only very slight almost non-existent ridges or furrows at the surface of the tear susceptible line (1007) and then mostly only on one surface, that incident to the laser beam.

Figure 12:
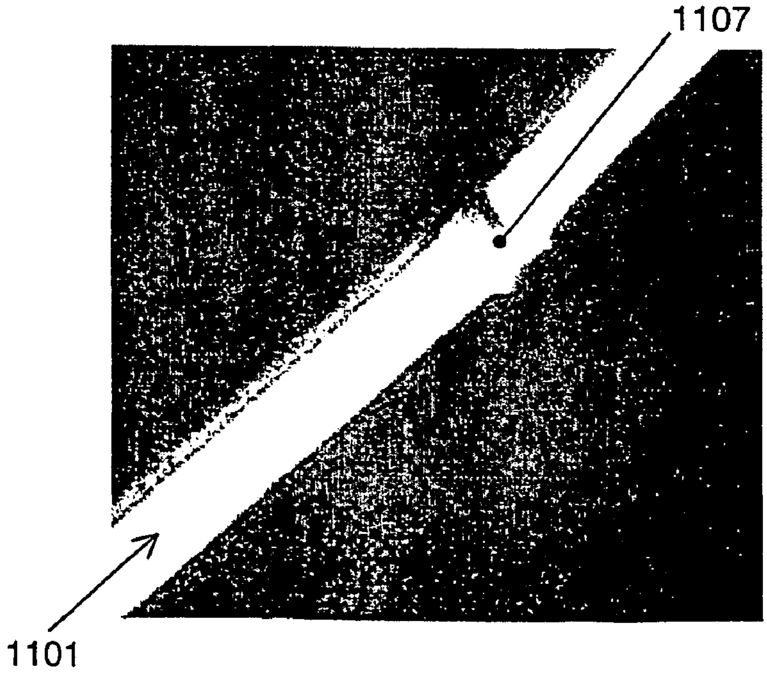

FIG. 12 is a photograph taken under polarised light of the same sample of Example 1 at the same magnification as in FIG. 11. It can be seen that the orientation of material within the tear susceptible line (1107) is different to that within the rest of the film (1101) as much less polarised light is transmitted through the tear susceptible line (1107) which appears almost black. This high contrast is due to a greater degree of light scattering from the polymer chains within the tear susceptible line which are at a different angle to the plane of polarisation of the incident polarised light than the polymer chains in the rest of the film. Thus when illuminated under polarised light, the tear susceptible line (1107) is seen as much darker when the rest of the BOPP film (1101) is bright (and vice versa).

Note when comparing features such as grooves and ridges the photographs of the film of the present invention (FIGS. 10 and 11) were taken at a higher (about twice) magnification compared to the photographs of the prior art film (FIGS. 8 and 9).

Measuring PP Chain Orientation within the Line

The degree of polarisation of certain bands in a spectrum obtained using polarised confocal Raman microscopy can be used to indicate the direction of preferred orientation within a sample and compare relative orientations between regions of a sample. This technique was used to demonstrate differential orientation of polypropylene polymer within a tear susceptible line of the present invention prepared on a BOPP film analogously to those examples described herein.

One of the Raman bands is strongest when the Raman laser is polarised parallel to the extended chain director (the parallel band) and another is strongest when the polymer chains are aligned perpendicular to the laser polarisation (the perpendicular band). There are many bands in the Raman spectrum of polypropylene (PP) which can be used for this purpose. The Raman band is identified by wave number which is the number of cycles of a wave in unit length and is the reciprocal of the wavelength. An intensity ratio can be measured which is the intensity of a parallel band [$=I_{\parallel}$ (wavenumber)] divided by the intensity of a perpendicular band [$=I_{\perp}$(wavenumber)]. One can infer from a high value of the intensity ratio that the polymer chains are preferentially aligned towards the direction of polarisation of the laser.

Figure 13:
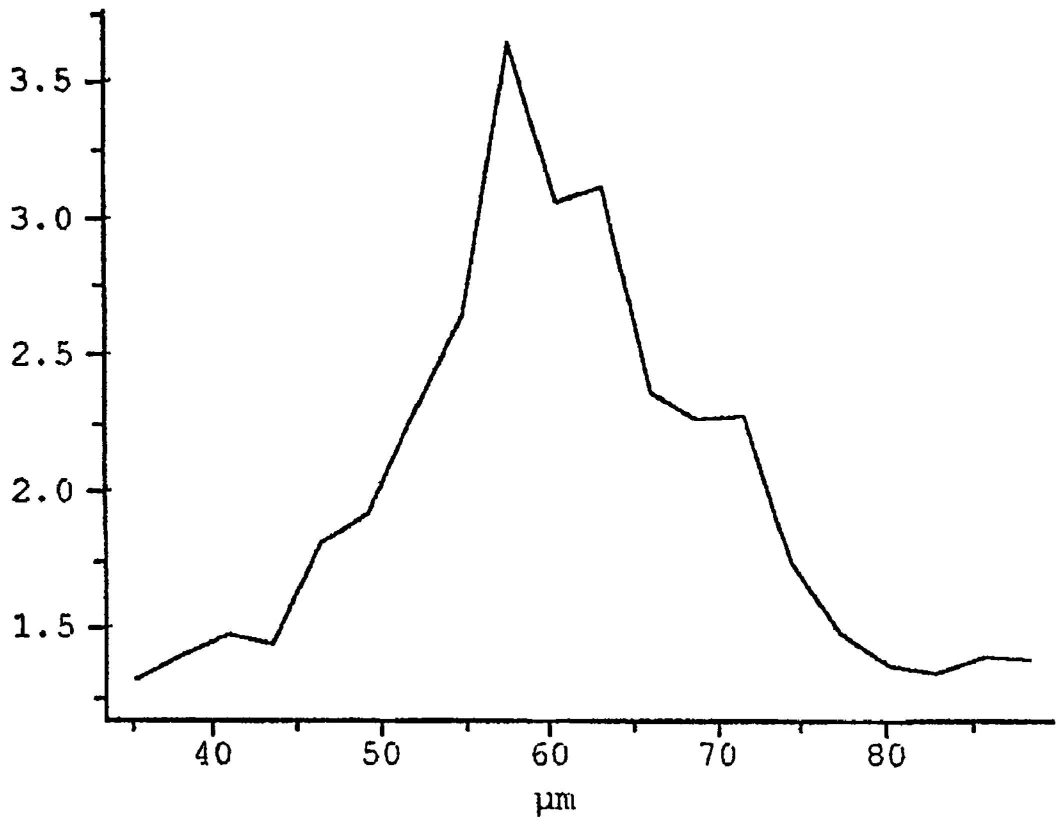
FIG. 13 is a plot of intensity ratio (derived from Raman spectra as described herein) across the width of a tear susceptible line of the present invention in a PP film showing the different PP orientation within the line compared to the PP in the rest of the film.

With reference to FIG. 13 herein, a Raman polarised laser beam was focused onto the surface of a film of the present invention comprising a BOPP film onto which a tear susceptible line was formed analogously to the method of the invention described in Example 1 herein. The line was observed visually under the Raman microscope to be about 25 to 30 microns wide. A 50 times magnification objective lens was used to give a lateral resolution of about 2 microns for the Raman laser beam. The relative intensity of a pair of bands in the Raman spectrum was measured whilst scanning the focus point of the Raman laser beam at 3 micron intervals along a track perpendicular to and across the tear susceptible line. The Raman laser beam was polarised parallel to the direction of this line.

The plot shown in FIG. 13 was obtained where the ordinate denotes the intensity ratio $I_{\parallel}(815\ cm^{-1})/I_{\perp}(840\ cm^{-1})$ which is dimensionless and the abscissa denotes the position of the Raman laser along the scan track as a distance in microns (μm) with respect to an arbitrary starting point on the PP film adjacent the tear susceptible line. Differences in polymer orientation within this line compared to the rest of the film can be seen. A higher intensity ratio is consistent with PP chains which are more preferentially oriented in the direction of the line.

The shape of the profile in FIG. 13 show that for this embodiment of a tear susceptible line of the present invention the orientation of PP chains is significantly higher within the line than in the surrounding film. The PP chains within the line are preferentially oriented therealong compared to PP in the rest of the film. Without wishing to be bound by any mechanism, one explanation may be because formation of a line with a laser as described in the Examples herein is at a power which is sufficiently low to be non ablative but sufficiently high to anneal the film along the line and hence re-orient the PP chains. To confirm that an optical artefact (e.g. due to instrument dichroism) was not being observed, the experiment described above was repeated by rotating the film through 90° in the spectrometer whilst keeping the laser polarisation fixed. Similar results were observed.

The invention claimed is:

1. A flexible, oriented polymeric, film having a thickness of from about 10 to about 120 microns and having at least one tear susceptible line(s) and/or pattern(s) thereon, wherein the film material within the line(s) and/or pattern(s) has a substantially improved, enhanced or redirected orientation to material in the rest of the film, the line(s) and/or pattern(s) lines having substantially the same gauge as the rest of the film, and the line(s) and/or patterns being formed by a directed chemical and/or radiation treatment which removes substantially no material from the film.

2. A film as claimed in claim 1, in which the material in the line(s) and/or pattern(s) is substantially more oriented in extent and/or direction that the material in the rest of the film.

3. A film according to claim 1, which comprises a thermoplastic polymer.

4. A film according to claim 1, which comprises a polyolefin and/or polyester.

5. A film according to claim 1, which comprises polypropylene.

6. A film as claimed in claim 1, which is biaxially oriented in substantially perpendicular directions.

7. A film as claimed in claim 1, in which in which the line(s) and/or pattern(s) thereon are formed by a directed treatment selected from irradiation through patterned lithographic masks, positioning of a chemical along the line; and/or focussed electromagnetic radiation and/or particulate radiation.

8. A film according to claim 1, in which the line(s) and/or pattern(s) are formed by ink-jet printing, chemical treatment or coating onto the film.

9. A film according to claim 1 in which the line(s) and/or pattern(s) are formed by laser treatment.

10. A film according to claim 9, in which the laser is a $CO_2$ laser having a wavelength about 10.6 μm.

11. A film according to claim 1, which has printing thereon.

12. A film according to claim 11, in which the printing indicates a position for initiating tearing of the film along at least one of the line(s) and/or pattern(s).

13. A film according to claim 1, in which at least one of the line(s) and/or pattern(s) extend to an edge of the film.

14. A film according to claim 1, having a cut extending from the edge of the film and/or a tab affixed thereto to assist in the initiation of a tear along at least one of the line(s) and/or pattern(s) on the film.

15. A film according to claim 1, in which at least one of the line(s) and/or pattern(s) on the film is sufficiently weaker than the rest of the film to enable tearing to be initiated therealong by hand pressure.

16. A package comprising at least one article wrapped in a flexible polymeric film as claimed in any of claim 1.

17. A package as claimed in claim 16, which is capable of being opened by finger pressure substantially along the line(s) and/or pattern(s) when tearing is initiated therealong.

18. A package according to claim 16, in which the film has been sealed around the article and tearing occurs with peeling of the seal.

19. A package according to any of claim 16, in which the film has been heat sealed around the article.

20. A package according to any of claim 16, in which printing thereon indicates a position for initiating tearing of the film to open the package.

21. A package according to any of claim 16, in which at least one tear susceptible line and/or pattern extends to the edge of the film on the package.

22. A package according to any of claim 16, having a cut extending from the edge of the film to assist in the initiation of a tear along a tear susceptible line and/or pattern on the film.

* * * * *